Sept. 20, 1960 G. B. ZURHEIDE 2,953,233
GLASS PACKAGING AND HANDLING MACHINE
Filed June 15, 1955 6 Sheets-Sheet 2
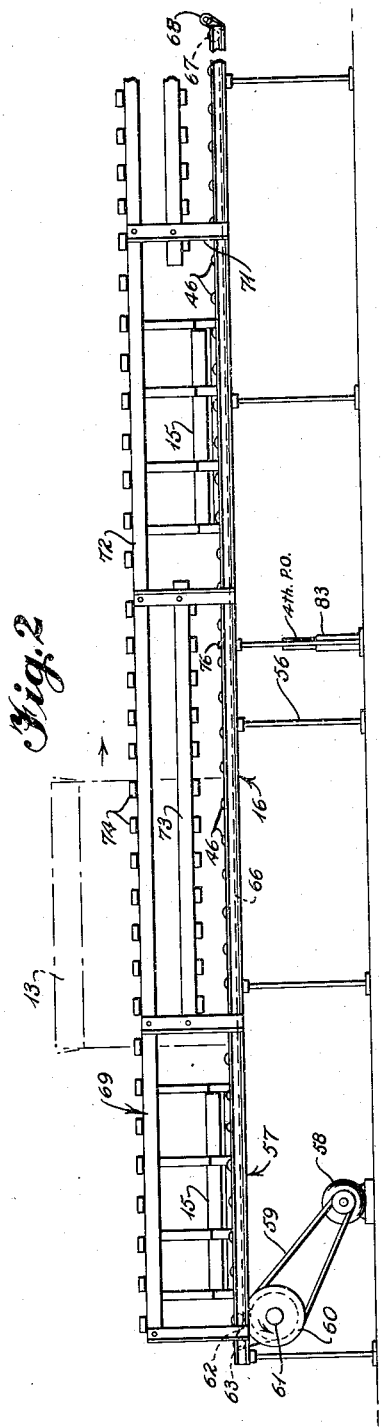
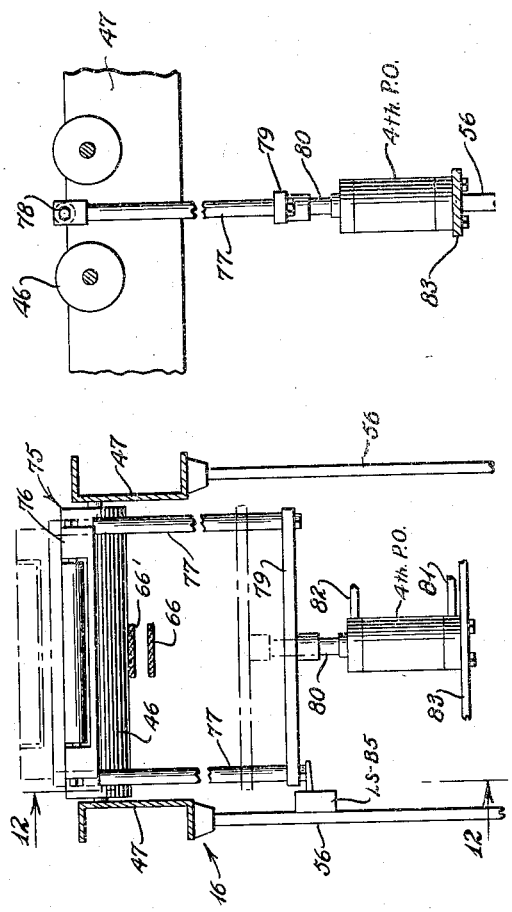
INVENTOR
George B. Zurheide
BY Oscar L. Spencer
ATTORNEY Sept. 20, 1960 G. B. ZURHEIDE 2,953,233
GLASS PACKAGING AND HANDLING MACHINE
Filed June 15, 1955 6 Sheets-Sheet 3
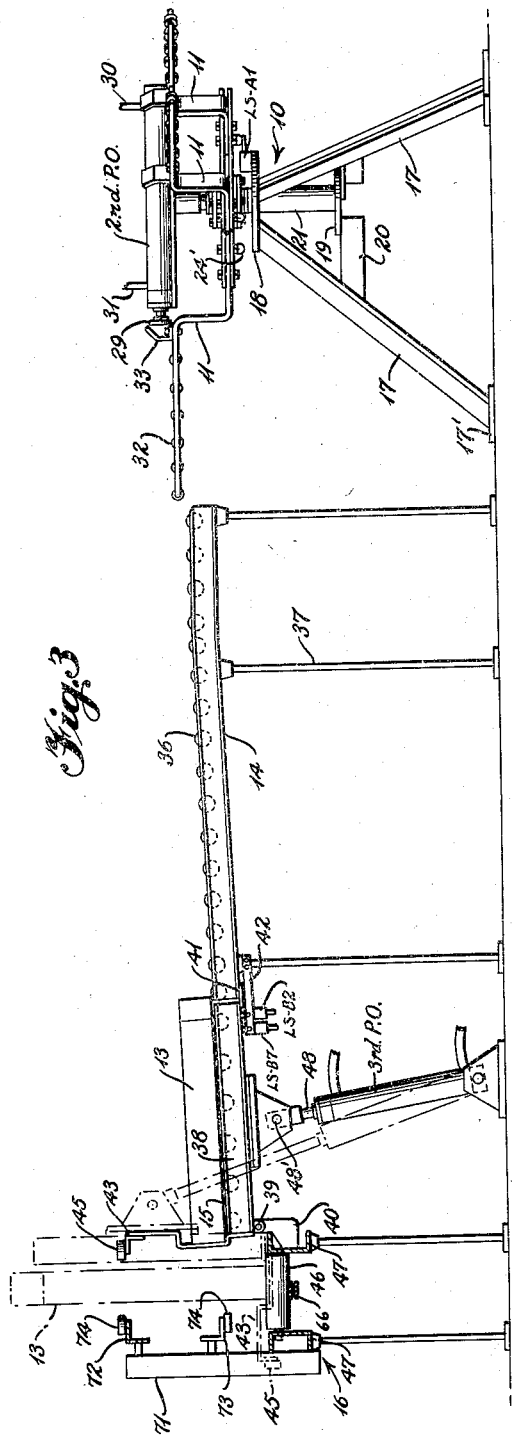
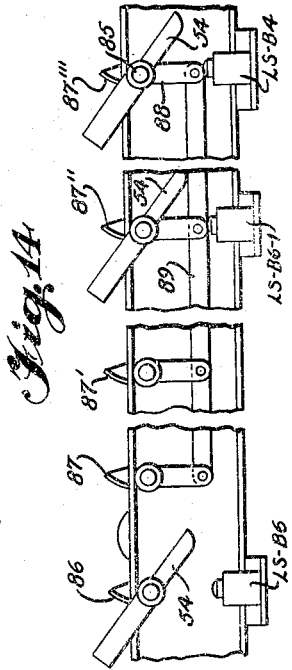
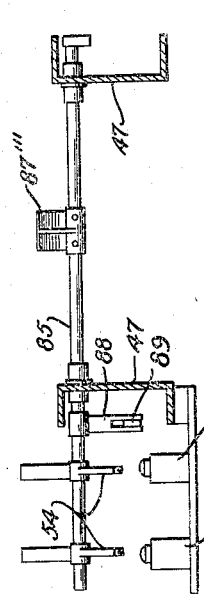
INVENTOR
George B. Zurheide
BY Oscar L. Spencer
ATTORNEY Sept. 20, 1960   G. B. ZURHEIDE   2,953,233
GLASS PACKAGING AND HANDLING MACHINE
Filed June 15, 1955   6 Sheets-Sheet 4
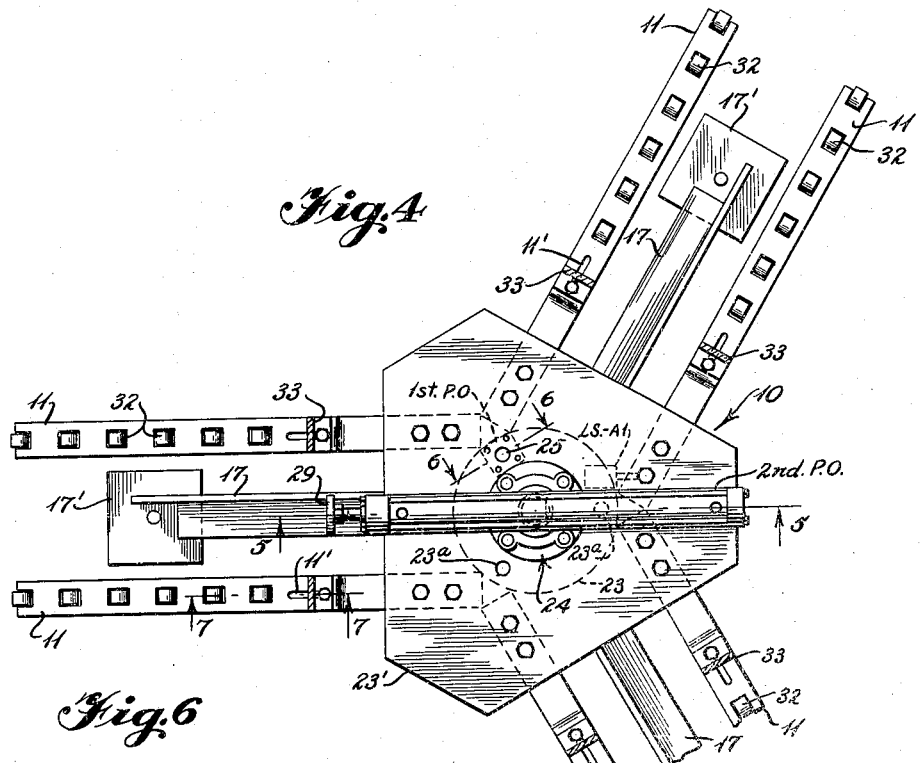
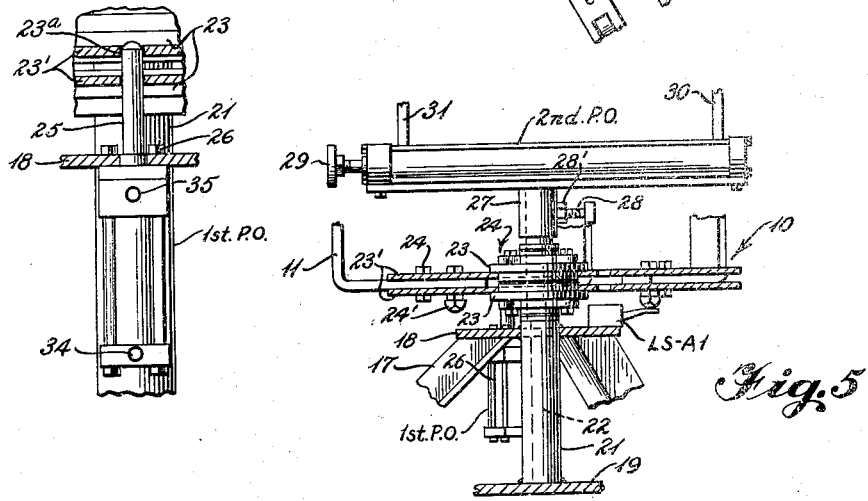
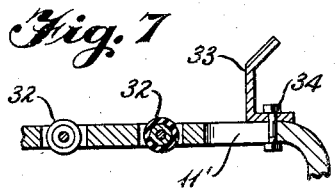
INVENTOR
George B. Zurheide
BY Oscar L. Spencer
ATTORNEY

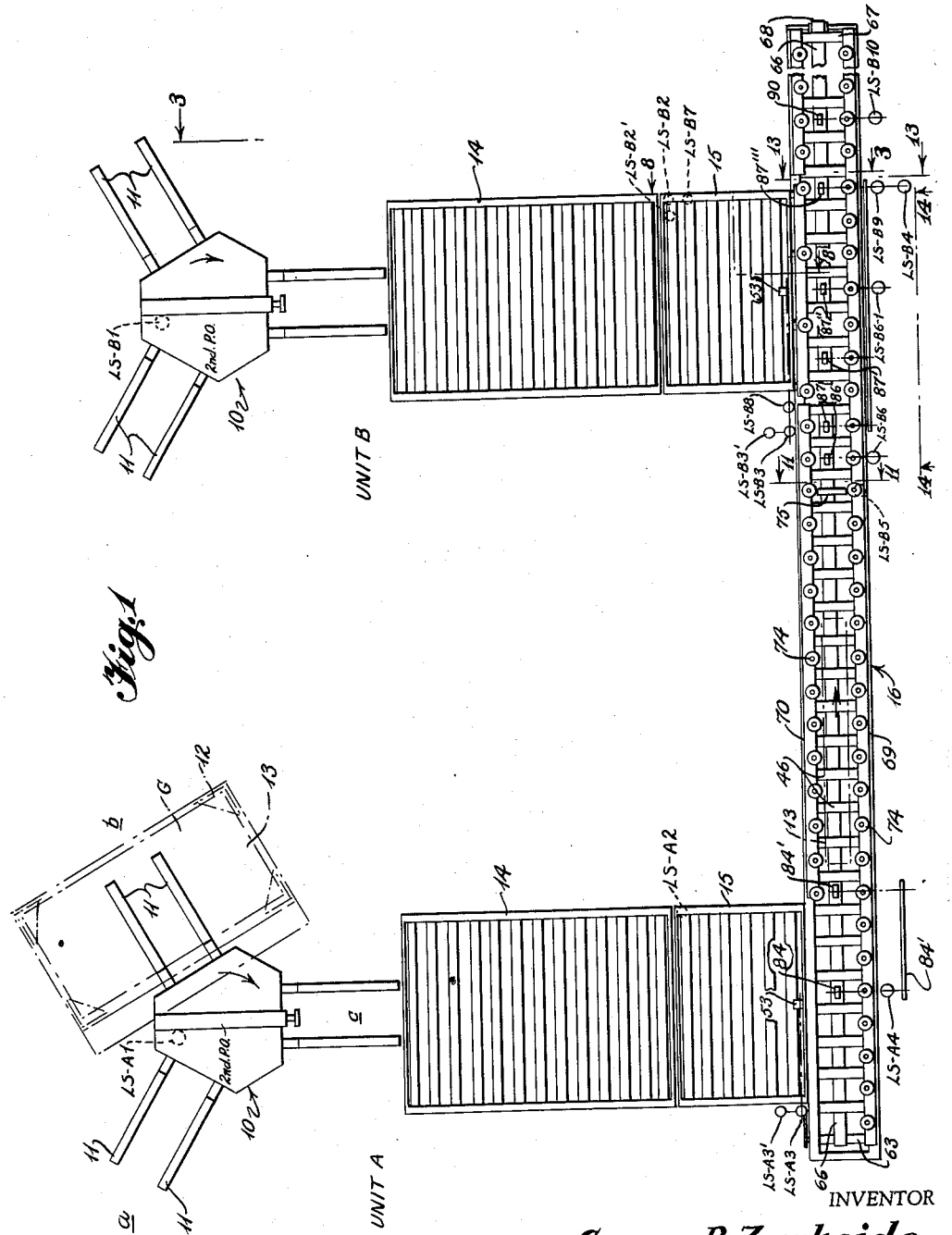

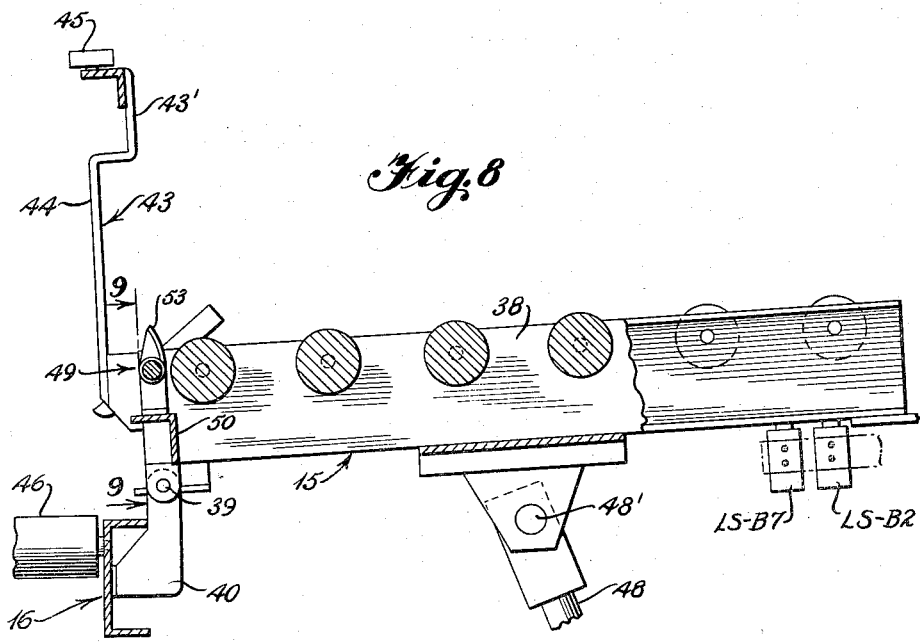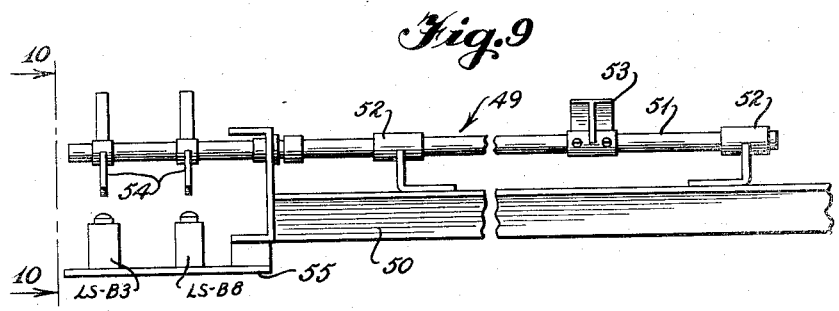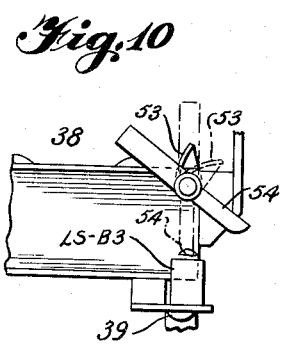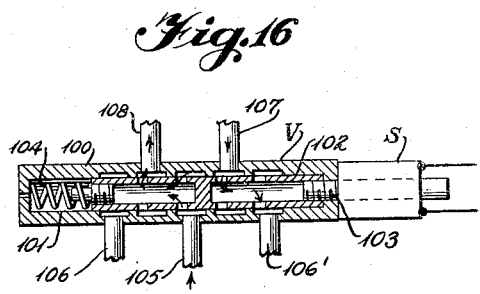

Sept. 20, 1960 G. B. ZURHEIDE 2,953,233
GLASS PACKAGING AND HANDLING MACHINE
Filed June 15, 1955 6 Sheets-Sheet 6

INVENTOR
George B. Zurheide

BY Oscar L. Spencer
ATTORNEY

United States Patent Office 2,953,233
Patented Sept. 20, 1960

2,953,233

GLASS PACKAGING AND HANDLING MACHINE

George B. Zurheide, Festus, Mo., assignor to Pittsburgh Plate Glass Company, a corporation of Pennsylvania Filed June 15, 1955, Ser. No. 515,574

23 Claims. (Cl. 198—21)

My invention is directed to apparatus for handling lights of glass, packaging the same, and handling the packages.

Plates or lights of glass of a uniform size are stacked together and packaged for shipment. The main purpose of this invention is to provide apparatus for stacking such lights of glass, enclosing same with packaging material and cartons and moving the filled cartons in an expeditious manner to a closing or stapling station.

It is an object of my invention to provide a revolvable table having spaced apart stations thereon for stacking plates of glass and for inserting thereover packaging material and moving the filled carton to a tilt table which places it onto a conveyor for further handling.

Another object of my invention is to provide a plurality of spaced apart turntables and accompanying tilt tables for depositing filled cartons onto a common conveyor adjacent the tilt tables.

Another object of my invention is to provide a control system for a plurality of packaging and conveying units used in conjunction with a common conveyor such that a subsequent unit will not deposit a filled carton onto a common conveyor if an obstruction is on the conveyor.

A still further object of my invention is to provide a tilt table for use with a conveyor having spaced apart vertical guides between which a package moves on the conveyor and wherein the tilt table has a foot with rollers thereon forming a vertical guide wall for the conveyor when the tilt table is in horizontal position, yet when tilted the foot supports a package thereon and transfers it to the conveyor.

Another object of my invention is to provide a revolvable packaging table having spaced apart radially extending arms for receiving plate-like articles and over which an open ended carton may be inserted.

Another object of my invention is to provide a common conveyor for a plurality of spaced apart transferring mechanisms that are positioned adjacent the conveyor so that articles are held on the conveyor at a position to prevent interference with a subsequent transfer mechanism and the subsequent transfer mechanism is held in transferring position until its article has been deposited onto the conveyor and has cleared the transfer mechanism.

Still further objects and the entire scope of applicability of the present invention will become apparent from the detailed description given hereinafter.

It should be understood, however, that the detailed description and specific example is given by way of illustration only, and while indicating the preferred embodiment of the invention, is not given by way of limitation, since various changes and modifications within the spirit and scope of the invention will become apparent to those skilled in the art from this detailed description.

For a more complete understanding of the nature and scope of my invention, reference may be had to the drawings in which:

Fig. 1 is a plan view of two units of turntable, tilt table, and common conveyor;

Fig. 2 is a vertical elevation of the common conveyor;

Fig. 3 is a vertical section along section line 3—3 of Fig. 1 showing the B unit;

Fig. 4 is a plan view on an enlarged scale of the A unit turntable;

Fig. 5 is a vertical sectional view along line 5—5 of Fig. 4 of the turntable upper portion;

Fig. 6 is a vertical elevation of the power-operated lock on an enlarged scale at line 6—6 of Fig. 4;

Fig. 7 is an enlarged sectional view along line 7—7 of Fig. 4 showing one of the arms of the revolvable table or turntable;

Fig. 8 is an enlarged sectional view of the tilt table of unit B along line 8—8 of Fig. 1;

Fig. 9 is a vertical view along line 9—9 of Fig. 8 showing the limit switch operating mechanism of the carton operated limit switch mechanism of the tilt table;

Fig. 10 is a view along line 10—10 of Fig. 9 of the switch operating mechanism;

Fig. 11 is a sectional view along line 11—11 of Fig. 1 showing the first stop in the conveyor;

Fig. 12 is a sectional view along line 12—12 of Fig. 11 of the stop mechanism;

Fig. 13 is a sectional view along line 13—13 of Fig. 1 showing conveyor mounted limit switch mechanism;

Fig. 14 is a sectional view along line 14—14 of Fig. 1 showing limit switch actuating mechanism and linkage along the conveyor;

Fig. 16 is a typical solenoid operated pneumatic valve of the two-way type for operating the various power operators.

Throughout the description like reference numerals and characters refer to similar elements.

Figure 15:
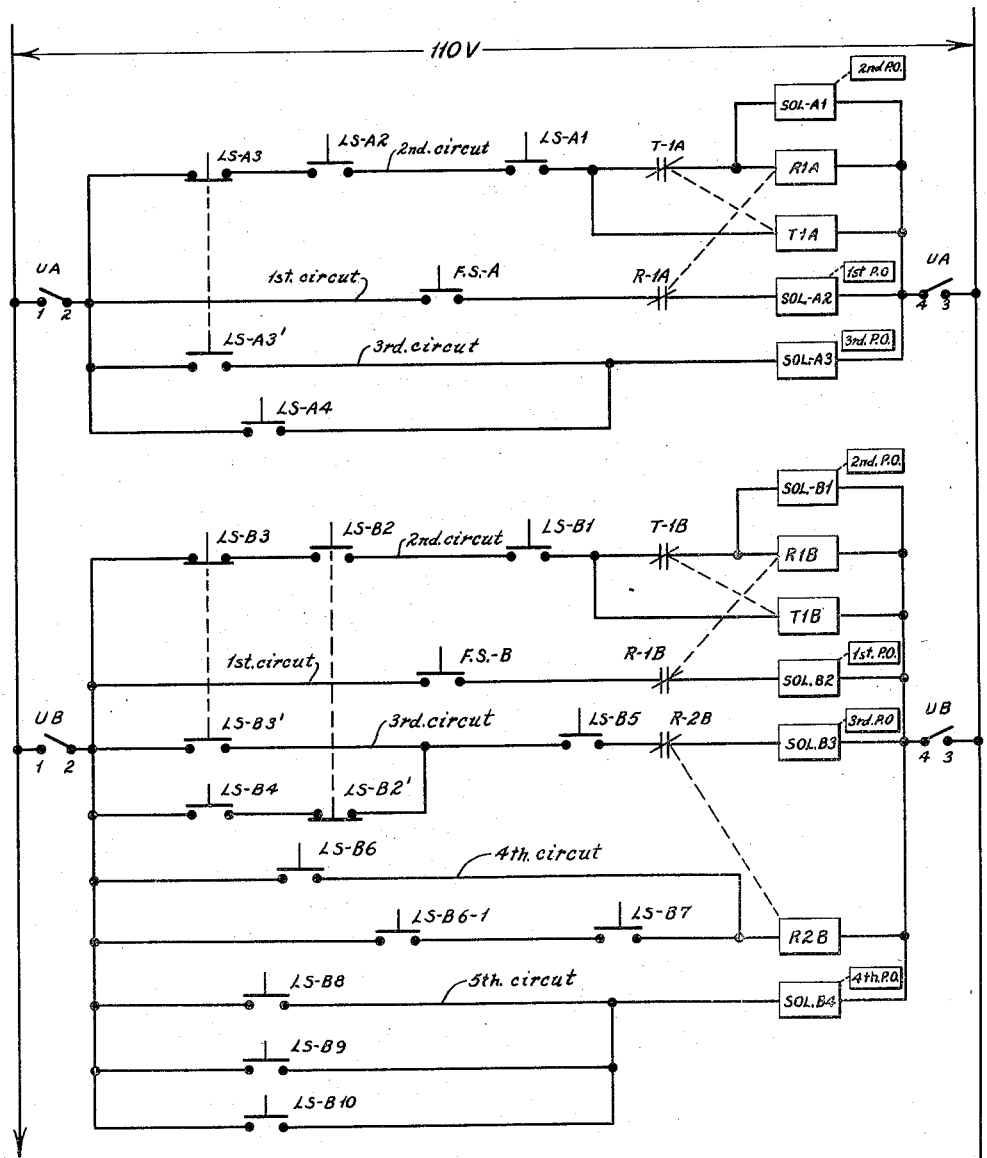
Fig. 15 is a schematic wiring diagram of the limit switches, relays and power operating mechanism of the combined packaging and conveying apparatus.

In Fig. 1 there is shown unit A and unit B of a typical number of similar units of the packaging and conveying mechanism according to my invention. While only two units have been shown here further units may be added to right of unit B.

A turntable or revolvable table is generally indicated at 10 and it has three pair of spaced apart arms 11 positioned 120 degrees apart and upon which is received at station $a$ stacked up plates of glass or for that matter other articles to be packaged. At station $b$ when the table is revolved in the clockwise direction there is slipped over the corners of the stacked glass G protective corner elements 12 then over the whole stack of glass and the corner elements there is slipped a carton or box 13 with its open face towards the center of the table 10. An operator at station $b$ then steps on a foot switch as will hereinafter be described and causes the turntable to be unlocked so that it may be manually revolved around to a selected next station thereby moving the packaged glass or the filled carton to the station $c$. At station $c$ a second power operator designated 2nd P.O. is actuated by limit switch LS–A1 and it pushes the filled carton or package onto an inclined conveyor 14 and the package thence rolls down to tilt table 15. Tilt table 15 is actuated as will hereinafter be described and it, as shown in Fig. 3, raises the filled carton 13 and deposits it in a vertical attitude onto a common conveyor generally indicated at 16. The filled carton on conveyor 16 moves to the right and to a station (not shown) to the extreme right of unit B where the flaps are closed and the carton is sealed by stapling.

In carrying out my invention it is necessary to maintain automatic operation of the tilt table and conveyor 15 and 16 respectively. At the same time it is necessary to provide for uniform flow without interruption or obstruction so that the filled cartons coming from unit A down conveyor 14 do not interfere with the operation of subsequent unit B and the further subsequent units. By the same token the subsequent units beyond unit B (not shown) have their tilt tables 15 operable only when it is clear on conveyor 16 thereadjacent the tilt table. To provide for this operation certain interlock and limit switch mechanism is provided which will be described later on in this specification.

In Fig. 3 the turntable or revolvable table generally indicated at 10 is shown in side elevation for unit B and more in detail in Figs. 4 and 5. Tripod legs 17 having foot pads 17' support a table plate 18 and through brackets 20 a subsupport plate 19. A vertically extending tubular kingpost 21 is supported in the center of the tripod leg 17 and it houses a vertical shaft 22 which extends upwardly beyond the top table plate 18. Mounted about the shaft 22 and above plate 18 is a pair of spaced apart plates 23—23 which are supported by a suitable bearing assembly generally indicated at 24 with the bearing assembly being mounted on the vertically extending shaft 22. Supported by plates 23—23 are additional spaced apart plates 23'—23' sandwiched therebetween which in turn have mounted thereon the L-shaped forks or brackets 11—11 which are spaced apart and upon which is received the lights of glass to be stacked and packaged. The L-shaped brackets are secured to the plates 23' by means of securing bolts 24. One of these bolts as indicated at 24' in each of the three sets of brackets 11—11 extends down below plate 23', the lower plate, and acts as an actuator for limit switch LS-A1, the purpose of which will be hereinafter explained. Reference to Fig. 4 shows three equally spaced apart apertures 23a which extend vertically in alignment in the plates 23—23 and serve to receive a vertically extending plunger or piston 25 which is thrust up and down by a first power operator indicated at 1st P.O. This first power operator is mounted to one side of the vertical column 21 as indicated in Fig. 4 by means of suitable bolts 26 which attaches it to the top plate 18 of the tripod assembly supporting the revolvable table generally indicated at 10. Each of the plates 23' is generally triangular in shape as shown in Fig. 4 but with their corners cut off so as to make a 6-sided plate as shown in Fig. 4.

Mounted on the top of shaft 22 of the revolvable table 10, is a second power operator indicated at 2nd P.O. This second power operator extends horizontally and is of the pneumatic type as is the first power operator, 1st P.O. This second power operator has extending transversely from the center thereof a collar 27 which is received over the upper end of shaft 22 held there by a set screw 28 having a locknut 28'. The second power operator has a plunger 29 and combined supply and exhaust lines 30 and 31 depending upon the position of the valve actuator typically shown in Fig. 16 which supplies air to and vents exhausts from each of the power operators.

Each of the arms or brackets 11—11 of the revolvable table 10 is provided with small spaced apart rubber covered rollers indicated at 32, see Fig. 7, which provide for moving the glass thereon. In stacking the glass on these brackets 11—11, an adjustable backstop 33 is provided on each arm 11 and it is held in adjusted position by means of a bolt 34 extending in slot 11' of each arm. These stops 33 are wrapped or coated with a suitable resilient coating (not shown). In Fig. 6 the first power operator, 1st P.O., is provided with suitable pneumatic connections 34 and 35.

Referring to Fig. 3, the conveyor 14 is positioned adjacent the revolvable table 10 and just slightly below the end of the brackets 11 such that a filled carton such as 13 may be pushed therefrom by the pusher 29 of the second power operator. A conveyor 14 is of typical construction made up of angle iron pieces supported by vertical supports 37 and having rollers 36 spaced apart. Conveyor 14 slants slightly downward toward the left so that the filled carton 13 rolls down by gravity onto the tilt table 15. Tilt table 15 has a roller section 38 which receives the filled carton 13 from the conveyor 14. The rectangular roller section 38 is pivoted as at its lower left-hand corner, see Fig. 3, as at 39 to the framework generally indicated at 40 of the common conveyor 16. The roller section 38 in its down position as shown in Fig. 3 rests at its upper end on a plate 41 protruding from the lower edge of the conveyor 14. Also attached to the lower end of the conveyor 14 is a bracket 42 supporting limit switches LS-B2 and LS-B7. Mounted behind limit switch LS-B2 is a first additional limit switch LS-B2' as best shown in Fig. 1 on unit B. The purpose of these switches and their use in the schematic circuit diagram shown in Fig. 15 will be explained later. Still referring to Fig. 3 and in more detail the enlarged showing of tilt table in Fig. 8, there is integrally formed or attached to the base end or bottom end of the tilt table 38 a transversely upwardly extending framework generally indicated at 43. This framework comprises spaced apart vertically extending straps 44 having their upper end 43', see Fig. 8, formed with a U-shaped portion which has attached at its end rollers 45. It will be noted in Fig. 8 that the roller 45 is generally positioned on a vertical axis along the edge of the conveyor 14 and above the conveyor rolls 46 of the common conveyor. These rolls 46 are positioned in spaced apart relation in a horizontal attitude and the filled cartons 13 are placed thereon by means of the tilt table which is shown in broken line position fitting into the top of the conveyor 14 to the left of Fig. 3. The U-shaped portion at the end of the vertical straps 43 as indicated at 43' fits over one of the spaced apart longitudinal channel members 47 of conveyor 14. Spaced apart channel members 47—47 support the spaced apart rollers 46. The tilt table thus has the bottom or foot framework 43 thereof serving as a stop or support for the end of the carton 13 when it slides down onto the tilt table and also serves as a support for this carton 13 when it is elevated to the vertical position in transferring same to the conveyor 16. The straps 43 set down below, see Fig. 3, the top surface of the rollers 46, so as to transfer the filled carton 13 to the conveyor 16. The rollers 45 in the full-line position as shown in Fig. 3, serve as guides for cartons 13 coming down the conveyor 16, when passing the tilt table. The tilt table 15 is pivoted or operated by means of a third power operator, 3rd P. O., of the pneumatic type which has a piston 48 connected to the tilt table 15 by means of pivot 48'. Still referring to Fig. 8, it will be noted that a limit switch operator generally indicated at 49 is provided and mounted on the tilt table cross frame 50, see Fig. 9. This limit switch operator comprises a shaft 51 mounted in bearings 52 supported on the frame 50 of the tilt table, and the shaft 51 extends to the left of the tilt table as shown in Fig. 9. A tripper dog 53 is secured to shaft 51 so that a carton rolling down onto the tilt table 15 will rotate the dog and the shaft 51 in a clockwise direction as shown by the broken line in Fig. 10, a side elevation of the limit switch operating mechanism for the tilt table. Still referring to Figures 8, 9, and 10, the shaft 51 extends to the left as shown in Fig. 9, and supports switch operating levers 54 which operate the limit switches LS-B3 and LS-B8 supported at the left of the tilt table 15 on a horizontal bracket 55. A limit switch LS-A3 similar to limit switch LS-B3 is provided on the A unit. Also shown in Fig. 1 in conjunction with the limit switches LS-A3 and LS-B3 and mounted therebehind and in conjunction therewith are first additional limit switches LS-A3' and LS-B3' which are operated at the same time that their primary limit switches are operated, however, if LS–A3 or LS–B3 is open by the presence of a carton on the dog 53, the first additional limit switch thereto, LS–A3' or LS–B3', is closed and vice versa.

Fig. 2 shows a vertical elevation of the common conveyor 16 which passes along in adjacent relationship to each of the tilt tables 15 of the various units so as to pick up and transport the filled cartons placed thereon by each of the respective tilt tables. This conveyor 16 is supported on vertical spaced apart supports 56 and the left-hand section is a power drive section generally indicated at 57. This first power section 57 is 5 feet in length while the subsequent sections are 10 feet in length. An electric motor 58 drives through a belt 59 at pulley 60 mounted on shaft 61 underneath the conveyor 16 and this drives through a belt 62 a pulley 63 which in turn drives an endless belt 66 passing under an idler pulley 67 and around a further idler pulley 68 at the extreme right-hand end. In Fig. 11, upper reach 66' of the belt 66 frictionally drives the rolls 46 of the common conveyor 16. By this means the first power section drives 66 which imparts clockwise rotation to each of the rollers 46 as viewed in Fig. 2 so as to move from left to right any cartons supported thereon. Associated with this conveyor 16 is a vertical framework 69 at the near side as shown in Fig. 2 and 70 at the far side. The side vertical frameworks are made up of angle iron members consisting of the vertical post 71 and the horizontal angle iron pieces 72, as well as the intermediate angle iron pieces 73 which are positioned between the respective units. Skate wheels or rollers 74 are mounted on vertical axes on these horizontal angle iron members 72 and 73 so as to form frictionless side guides for directing the filled cartons along the path of conveyor 16 on the rollers 46.

Fig. 11 is an enlarged view along section line 11—11 of the conveyor 16 which shows the first stop in the conveyor. This stop is generally indicated at 75 and serves to interrupt the movement of cartons from left to right from unit A towards unit B, so that the carton being dispensed by unit B and the tilt table 15 thereof will not be interfered with or obstructed by a carton from unit A. The stop 75 is comprised of a cross frame 76 with two depending legs 77—77 mounted for sliding up and down movement between the longitudinal channel side members 47—47 of the conveyor 16. The top member 76 has mounted therein a small roller 78 as shown in Fig. 12, which when the stop is in the down position is in alignment with the adjacent rollers 46 of the conveyor 16. The bottom ends of the depending legs 77—77 of the stop 75 are tied together by a horizontal cross bar 79 to which is attached a power piston 80 of the fourth power operator, 4th P.O., which moves the stop up and down. The fourth power operator, 4th P.O. has pneumatic connection lines 81 and 82 which are connected through typical valve mechanism as shown in Fig. 16 which is operated by solenoid actuators so as to actuate the power operator. The fourth power operator, 4th P.O. is mounted on a suitable base 83 attached into the conveyor 16. In Fig. 11 there is shown in the upper portion thereof in broken lines the extreme upward position of the stop 75.

In Fig. 1 at the lower portion thereof there is indicated the location of the various limit switches not only connected with the tilt tables 15 but also with the common conveyor 16. Some of the limit switches on the conveyor 16 are attached together by suitable linkage as shown in Figs. 13 and 14 such that by operating any one of the dogs of the tied together linkage any of the limit switches actuated by that linkage is either closed or opened according to its function.

At the power end of the conveyor or the left end of the conveyor 16 as viewed in Fig. 1, the first limit switch to appear is LS–A4. Adjacent the unit A tilt table 15 there is positioned a dog 87''' mounted on a shaft 85 typically shown in Fig. 13 for the units. This dog is similar in construction and operation to the dog 53 shown in Fig. 9 on the tilt table. Limit switch LS–A4 is operated by this dog 87''' in a similar manner to limit switch LS–B3 and LS–B8 shown in Fig. 9 and the limit switch LS–B4 shown in Fig. 13. Thus, the shaft is indicated in Fig. 13 and the dogs will be indicated but the actuating lever arms 54 shown in Fig. 9 for the limit switches will not be recommented on as they are common construction. At the left-hand of Fig. 1 on the conveyor 16 there is a link 84'' which extends adjacent and lengthwise of the conveyor and connects the shaft of dog 84 with a shaft of a dog 84' positioned just beyond the edge of the tilt table 15 of unit A. Thus, when a carton from the tilt table 15 of unit A moves along conveyor 16 and passes over the dogs 84 or 84', limit switch LS–A4 will be actuated which is in circuit as will be hereinafter described with the 3rd P.O. which raises this table 15 of unit A.

Referring back to Fig. 11 there is mounted on one of the legs 56 limit switch LS–B5 which is normally open when the stop 75 is down. Thus, when the stop 75 moves up limit switch LS–B5 completes a circuit which allows the power operator for the lift table 15 of unit B to operate as will also hereinafter be described. This limit switch LS–B5 is shown adjacent the stop 75 in Fig. 1.

In Fig. 1 at the right-hand portion thereof adjacent unit B and downstream from the stop 75 the first dog to appear is 86 and this is connected to operate in a similar manner as shown by the structure in Fig. 13 the limit switch LS–B6. Next downstream from the dog 86 are the spaced apart dogs 87, 87', 87'' and 87''' which are adjacent and at each end of lift table 15 for unit B. Reference to Fig. 14 shows in more detail their structure and linkage connection. Each of these dogs is mounted on a typical shaft 85 and has lever operator 84 connected thereto outboard of the conveyor member 47, such that they contact the various limit switches as there indicated in Fig. 1 and Fig. 14. In Fig. 13 it will be noted that connected to this shaft 85 is a depending arm 88 and this is connected by a common interconnecting link 89 such that all the dogs 87, 87', 87'', and 87''' when operated by a filled carton passing thereover, operate through the common linkage to various limit switches.

The extreme right-hand dog shown in Fig. 1 for conveyor 16 is indicated at 90 and it operates through a typical shaft 85 and lever actuator 54 the limit switch LS–B10.

In Fig. 16 there is shown a typical valve V which is operated by a solenoid S. The valve V supplies air to and exhausts it from any of the typical power operators of the pneumatic type here used in this packaging and conveyor assembly for imparting motion. The valve B has a body 100 which is elongated and has a cylindrical cavity formed therein as at 101 to receive the valve-like piston 102 which is moved by the plunger or armature 103 of the solenoid S. The inner valve body 102 is biased to the right by a compression spring 104. To the body 100 there is attached an air supply line 105 and spaced to either side thereof are exhaust connections 106 and 106' also connected into the body 100 of the valve assembly V. The air supply and return lines for the power operators are indicated at 107 and 108. These conduits 107, 108 will be supply lines in one positioning of the valve body 102 and discharge lines in another position. In the position shown, air is received at 105 and passes through the ports shown in the valve body 102 by the arrows to the supply line 108 to an air cylinder or power operator while the exhaust from the power operator comes through line 107 and through the ports in the valve body 102 as shown by the arrows to the exhaust line 106' in this typical representation. Each of the power operators in this apparatus has a similar valve which is operated by a respective solenoid as indicated in the schematic wiring diagram in Fig. 15 to be described.

Fig. 15 shows the layout for units A and units B of the limit switches, relays, interlocks, and power operator controls as will now be described. The source of power is 110 volts and power is supplied from this source to the unit A section, the upper section of the diagram, by means of a switch UA connecting one side of the line by contacts 1 and 2 and the other side of the line to the source by contacts 3 and 4. A similar switch UB is provided for in B. The first circuit consists of a Sol. A2 for the 1st P.O. and this has in circuit therewith to energize same relay contacts R–1A and a foot switch FS–A. This foot switch is in position to be actuated by the operator at station $b$ as shown in Fig. 1 at one of the selected positions of the turntable of the A unit. Upon closing foot switch FS–A, Sol. A2 is energized and the valve V as typically shown in Fig. 16 operated by the solenoid retracts the first power operator 1st P.O. and this pulls out the plunger which locks the turntable 10 of unit A and allows the operator at the $b$ station to rotate the turntable 120 degrees so that the filled carton is positioned at station $c$ in a position to be moved by the pusher 29 of the second power 2nd P.O. The relay contacts R–1A are actuated by the relay solenoid R1A in the second circuit to be described. Thus, unless relay R1A is energized relay contacts R–1A are not closed to complete the foot switch circuit or the first circuit to unlock the turntable A, turntable A being unlocked by means of the first power operator locking means and unlocking means.

The second circuit will now be described. This is shown at the upper portion of each of the units A and B portions of the circuit in Fig. 15. Connected in series are the following limit switches to energize Sol. A1 to actuate the second power operator, 2nd P.O.: LS–A3, LSA–A2, LS–A1, and time relay contacts T–1A. In parallel with Sol. A1 is the relay solenoid R1A. Connected in parallel about the relay contacts T–1A and relay solenoid R1A of the second circuit is the relay solenoid T1A which actuates the relay contacts T–1A. This relay T1A is a time-delay relay and limits the time that the second circuit is complete to the second power operator. In the second circuit to actuate same, LS–A3 is normally closed and will interrupt the circuit if a filled carton is on the tilt table, in the way of the pusher 29 operated by the second power operator. LS–A2 is closed when the tilt table 15 of the A unit is down and in position to receive a filled carton. LS–A1 is closed by the limit switch on the turntable when it is in a proper selected position so that a filled carton is in position in front of the second power operator 2nd P.O. at station $c$.

The third circuit for the unit A will now be described. In this circuit is a solenoid Sol. A3 which operates the third power operator 3rd P.O. and this is actuated when limit switch LS–A3′ is closed upon the occurrence of a filled carton sliding down onto the tilt table and striking the dog actuator for this limit switch LS–A3′ to close same to complete a circuit to Sol. A3′. This third power operator lifts the tilt table 15 of the unit A and raises the filled carton to a vertical position on the conveyor 16. Since the filled carton has moved off the tilt table and does not any longer hold down limit switch LS–A3′, it is necessary to supply a holding circuit in parallel with limit switch LS–A3′ and this is furnished by the limit switch LS–A4 which is closed by the carton resting on the conveyor 16. As the filled carton passes along conveyor 16 it will strike two different dogs and hold the limit switch LS–A4 closed as the two dogs are tied in by a linkage as shown in Fig. 1.

The B unit part of the circuit has similar first, second, and third circuits to those of the A unit as described above. In addition, there are certain holding circuits and interlocked circuits necessary as respects the subsequent units B in order to assure proper functioning of the tilt tables. It is important that the common conveyor be clear or empty adjacent the tilt table before the tilt table deposits its filled carton onto the conveyor.

The B unit first circuit includes a foot switch FS–B first relay contacts R–1B and the solenoid Sol. B2 which actuates the first power operator 1st P.O. This first power operator as in the A unit is the locking means for the turntable B. The second circuit includes limit switches LS–B3, LS–B2 and LS–B1, the second set of relay contacts T–1B and the solenoid Sol. B1. The solenoid Sol. B1 operates the second power operator 2nd P.O. which is the pusher and pushes the filled carton from the turntable B onto the conveyor 14 and tilt table 15. As in the second circuit for unit A the solenoid of relay R–1B is in parallel relation with the solenoid Sol. B1, and it operates the first set, R–1A, of relay contacts in the first circuit holding them open while the second circuit is energized and thus preventing movement of the turntable while the pusher is making its out and in stroke. Also in the second circuit there is the timer solenoid T1B which operates the timer or second contact T–1B that is in parallel about the solenoid R1B and the time contacts T–1B and this circuit limits the hold time of relay R–1A in the second circuit. This permits the turntable to operate after the set time when the pusher has returned back to its proper position.

Still referring to the B unit we now come to the third circuit which has third relay contacts and a further limit switch LS–B3 in series therewith as will be described. This third circuit includes limit switch LS–B3′, the additional limit switch to the carton operated limit switch of the tilt table, the limit switch LS–B5, third relay contacts R–2B and the solenoid Sol. B3 which actuates the third power operator 3rd P.O. This third power operator lifts table B and to maintain the table tilted there is a holding circuit parallel to limit switch LS–B3′, namely, LS–B4, a limit switch on the conveyor 16 and this is actuated by the carton from lift table B to hold the table up or tilted until the carton clears the tilt table. In order to ensure that a carton from unit A passing over limit switch LS–B4 will not operate tilt table B, limit switch LS–B2′, a first additional limit switch to the tilt table limit switch LS–B2 is in circuit with LS–B4 in parallel about limit switch LS–B3′ in the third circuit and thus when the lift table B is down limit switch LS–B2′ will open and prevent a carton passing over limit switch LS–B4 from unit A from operating the tilt table B. Also in the third circuit and referred to above is a limit switch LS–B5 which limit switch is actuated by upward movement of a first stop 75 which prevents cartons from unit A coming down conveyor 16 and interfering with operation of tilt table B to deposit a carton onto the conveyor 16.

The fourth circuit serves to operate the solenoid of relay R2B, the third relay contacts operator, namely, third relay contacts R–2B in circuit 3, and this holds up the third circuit from operation until conveyor 16 is clear as will now be described. This fourth circuit includes limit switch LS–B6 which is connected in series with solenoid R2B and also with the source of power, and when a carton is on the dog operator for limit switch LS–B6, relay R2B is energized to hold out the lift circuit for the tilt table B. Operating in parallel with limit switch LS–B6 are two in series limit switches LS–B6′, a first additional limit switch to limit switch B6, and limit switch LS–B7. This ensures that if a carton is passing over the dog operator for LS–B6–1 and the tilt table B is down to close the limit switch LS–B7, relay solenoid for the third relay contacts operator, R2B, will be energized.

A fifth circuit is included in the unit B system and it operates the fourth power operator which raises and lowers the first stop. This fifth circuit includes the solenoid Sol. B4 and limit switch LS–B8 with two additional limit switches with LS–B8, namely, LS–B9 and LS–B10. Thus, when any of these dogs operating these limit switches LS–B8, LS–B9 and LS–B10 are covered by a carton, solenoid Sol. B4 is energized and the fourth power operator 4th P.O. is actuated to hold up the first stop.

It will be noted that the limit switches LS–B1, LS–B9 and LS–B4 are tied in together by a linkage 89 such that when any of the four dogs tied in with this linkage is moved by a carton passing thereover the linkage is actuated to actuate each of these respective limit switches.

In like manner, additional subsequent units such as C and D (not shown) may be added and interlock circuits and operating circuits may likewise be provided similar to circuit B so as to provide protection and orderly operation of the system.

I have provided a packaging and handling apparatus which while described for handling lights or plates of glass may equally as well be used for other articles which are to be packaged and moved to a closing station.

I claim as my invention:

1. A glass packaging and handling machine comprising, in combination, a frame assembly, a revolvable table mounted on the frame assembly about a vertical axis and having a pin receiving recess and a plurality of glass receiving stations thereon permitting a packaging carton to be placed over the glass received on each of said stations, a locking means on said frame including a reciprocable pin engaging said pin receiving recess on said table and cooperating with the revolvable table to permit selective rotation thereof; a power operated means on the frame and associated with said table for moving packaged glass from a glass receiving station after the table has been brought to a stopped position; said power operated means including a reciprocating piston acting radially from said table for moving the packaged glass from its receiving station; a tilt table for receiving the packaged glass from said stations on the revolvable table when moved therefrom by said power operated means, said tilt table being tiltable and having a power operator for tilting the same; and a conveyor for receiving the packaged glass from said tilt table, said tilt table having means movable therewith for supporting the packaged glass and brought into cooperation with said conveyor on tilting of said table to transfer the packaged glass to said conveyor.

2. A glass packaging and handling machine comprising in combination a frame assembly, a revolvable table mounted on the frame assembly about a vertical axis and having a plurality of glass receiving stations thereon where a packaging carton may be placed about the glass, a first power operated locking means on the frame for locking said table in selected positions, an electrical power source having connected thereto a switch for said first power operator and comprising a first circuit whereby a circuit is completed to said first power operator to unlock said table for turning, a table operated limit switch closed by said table when in one of said selected positions whereby the filled carton is positioned for removal from said table, a second power operated means on the frame and associated with the table for moving a filled carton from a glass receiving station, a tilt table for receiving the filled carton from said stations and positioned adjacent said second power operated means, said tilt table being tiltable and having a third power operator for tilting the same, a second limit switch closed by said tilt table when in down position, a third limit switch opened by a filled carton on said tilt table, said second and third limit switches being connected with said power source and said second power operated means and comprising a second circuit and when closed energizing said second power operated means to move said filled carton from the revolvable table to the tilt table, a conveyor associated with said tilt table for receiving a filled carton therefrom, an additional carton operated limit switch associated with said tilt table and closed by a filled carton thereon, said additional carton operated limit switch being connected with said power source and said third power operator which comprises a third circuit and when closed by a carton received on the additional carton operated limit switch causing said third power operator to tilt said tilt table and slide said filled carton onto said conveyor.

3. A glass packaging and handling machine according to claim 2 wherein said additional carton operated limit switch associated with said tilt table is combined with said third limit switch and operated by a common operator by a filled carton on said tilt table.

4. A glass packaging and handling machine according to claim 2 including a fourth limit switch positioned on said conveyor and connected in parallel with said additional carton operated limit switch in said third circuit and closed by a carton received on the conveyor from said tilt table to energize said third power operator to hold the tilt table tilted until said filled carton passes along said conveyor so as to not close said fourth limit switch.

5. A glass packaging and handling machine according to claim 2 wherein said first circuit has in series therewith a pair of first relay contacts through which said first circuit is completed, a first relay contacts operator in said second circuit in parallel with said second power operator means and energized therewith to close and open said first relay contacts in said first circuit when energized and deenergized whereby said first power operator locks said revolvable table from turning while said power operator is in its packaged carton pushing cycle.

6. A glass packaging and handling machine according to claim 5 wherein a pair of second relay contacts are interposed in said second circuit in series with said second power operator and between said second power operator and said table, second and third limit switches and a second relay contacts operator of the time delay type in said second circuit in parallel with said first relay contacts operator and said second relay contacts whereby said second relay contacts are opened after a set time delay to deenergize said second circuit and said first contacts operator to permit said first circuit operation.

7. A glass packaging and handling machine comprising in combination a plurality of revolvable tables each mounted on a frame assembly about a vertical axis and in spaced apart relation, and having a plurality of glass receiving stations thereon where a packaging carton may be placed about the glass, a first power operated locking means on each frame for locking each table in selected position, an electrical power source, a switch for each first power operated locking means connected to said power source and said first power operated means for each table and comprising a first circuit for each table whereby a circuit is completed to said first power operator to unlock each respective table for turning, a table operated limit switch for each table closed by said table when in one of said selected positions whereby the filled carton is positioned for removal from each table, a second power operated means on each frame and associated with each table for moving a filled carton from a glass receiving station, a tilt table for each revolvable table to receive the filled carton from said stations of each table and positioned adjacent each respective second power operated means, each revolvable table and its associated tilt table comprising a unit, each tilt table being tiltable and having a third power operator for tilting the same, a second limit switch closed by said tilt table when in down position, a third limit switch for each tilt table opened by a filled carton on said tilt tables, each set of said table, second and third limit switches being connected with said power source and each respective second power operated means and each comprising a second circuit for each revolvable and tilt table associated therewith and when closed energizing each of said second power operated means to move said filled carton from each revolvable table to its respective tilt table, a common conveyor associated with said tilt tables for receiving filled cartons therefrom, a first additional carton operated limit switch associated with each tilt table and closed by a filled carton thereon, said first additional carton operated limit switch being connected with said power source and said third power operator which comprises a third circuit for each revolvable table and its associated tilt table and when closed by a carton received on the first additional carton operated limit switch causing said third power operator to tilt said tilt table and deposit said filled carton onto said conveyor, a fourth limit switch positioned on the conveyor adjacent each of said tilt tables and connected in parallel with said first additional carton operated limit switch in each of said third circuits and closed by a carton received on the conveyor from said tilt table to energize said third power operator to hold the tilt table tilted until said filled carton passes along said conveyor out of engagement with said fourth limit switch, each of said subsequent units of revolvable table and tilt table after said first unit thereof having interlock means for preventing the operation of the tilt tables thereof if a filled carton is on the common conveyor in an obstructing position adjacent the respective tilt table and means for arresting the passage of a filled carton for movement on the conveyor at a station just preceding one of said subsequent units.

8. A glass packaging and handling machine according to claim 7 wherein said interlock means in each subsequent unit for preventing the operation of the tilt tables of the subsequent units if a filled carton is on the common conveyor in an obstructing position and said arresting means comprises a gate stop for a filled carton associated with said conveyor intermediate adjacent tilt tables, a power operator for said stop, the third circuit for the subsequent unit including a fifth limit switch in series therewith and associated with said conveyor and stop and closed by the upward movement of said stop and a pair of third relay contacts also in series therewith completing when closed the third circuit, a first additional tilt table limit switch opened by said tilt table when in down position and in series with said fourth limit switch on the conveyor to prevent a filled carton on the conveyor when passing a tilt table from operating that tilt table, a third relay contacts operator operatively connected with said third relay contacts and upon energization holding said third relay contacts open to interrupt said third circuit, to prevent said tilt table from being tilted when a filled carton on the conveyor obstructs the same, a sixth limit switch mounted on said common conveyor adjacent said stop on the downstream side thereof and closed by a filled carton passing thereover, a seventh limit switch associated with said sixth limit switch being in series with said third relay contacts operator, connected to said power source, and forming a fourth circuit to energize said third relay contacts operator, a first additional limit switch to said sixth limit switch on said conveyor and downstream from said sixth limit switch adjacent said tilt table and closed by a filled carton passing thereover, a seventh limit switch positioned to be closed by said tilt table when down, said first additional limit switch to the sixth limit switch and the seventh limit switch being in series and forming a circuit in parallel with said sixth limit switch to maintain the third relay contacts operator energized to hold open the third relay contacts and prevent the tilt table from being tilted, an eighth limit switch associated with said tilt table and closed by a filled carton passing thereover, said eighth limit switch being connected to the power source and to said fourth power operator which when energized holds up said stop on the conveyor, a ninth limit switch associated with said conveyor downstream from said first additional limit switch to the sixth limit switch, adjacent said tilt table and closed by a filled carton passing thereover, said ninth limit switch being in parallel with said eighth limit switch and when closed by a carton thereon also energizing said fourth power operator to raise said stop and a tenth limit switch associated with said conveyor and further downstream from said ninth limit switch also in parallel with said eighth limit switch and when closed by a carton passing thereover energizing said fourth power operator to maintain said stop raised.

9. A glass packaging and handling machine according to claim 8 wherein said fourth limit switch associated with the common conveyor and the first of said units has a pair of spaced apart operator means on the conveyor interconnected by a linkage for operation by a carton passing over either operator means, and said additional limit switch to said sixth limit switch, said fourth limit switch and said ninth limit switch all associated with said subsequent unit have a common operator linkage connecting the same and a plurality of spaced apart operator means on the conveyor adjacent said tilt table of the subsequent unit whereby a carton on the common conveyor striking any one of said first mentioned operator means actuate said limit switches connected for operation therewith.

10. A material and article handling turntable comprising a frame having a vertically extending tubular post, a bearing assembly fitted over the post, a pair of spaced apart plates supported by said bearing for rotation about said tubular post, spaced apart brackets extending radially out from said spaced apart plates, said spaced apart brackets being in pairs and adapted to receive thereon and support in a horizontal manner articles to be packaged, said brackets comprising a turntable adapted to be revolved to various selected stations in complete rotation, said brackets having stops thereon for positioning the articles to be packaged and a pusher means attached to said vertically extending tubular member for pushing off said packaged articles from the brackets when said turntable is rotated to a selected position in alignment with said pusher means.

11. A material and article handling turntable according to claim 10 wherein said brackets are offset in a vertical manner and said push means are mounted on a shaft extending vertically from and housed in said tubular post.

12. A material and article handling turntable according to claim 11 including lock means for locking said turntable in selected positions for packaging operations.

13. A material and article handling turntable according to claim 11 wherein said brackets have mounted on their outer portions spaced apart rollers having the axes thereof extending parallel to each other and transverse to the radially extending brackets.

14. A material and article handling mechanism comprising, in combination, a tilt table and a conveyor cooperating therewith to receive articles transferred from the tilt table to the conveyor, said conveyor having vertically extending spaced apart guide member means adjacent each side of the tilt table, said tilt table being tiltable between said spaced apart guide member means from a generally horizontal position to a vertical position adjacent said conveyor to transfer an article from table to conveyor and having a foot framework portion at the end of the table adjacent said conveyor and extending transversely upward from the table and in alignment with the adjacent spaced apart side guide member means of the conveyor, said foot framework portion serving as a stop to hold the article on the table and upon tilting the table upwardly to a vertical position the foot framework rests horizontally in said conveyor to transfer the article to the conveyor, said foot framework when in vertically extending position with the table down being in alignment with said vertically extending spaced apart guide member means adjacent each side thereof and serving as a vertical side guard for articles moved on said conveyor.

15. A material and article handling mechanism according to claim 14 wherein said tilt table has spaced apart roller elements thereon to receive said article and said foot framework has roller elements mounted thereon whose axes extend perpendicular to the table.

16. A material and article handling mechanism according to claim 15 wherein said conveyor has spaced apart rollers therein and said foot framework on the table has spaced apart straps extending transverse to said table and provided with offset portions thereof adapted to drop below the tops of the rollers on the conveyor to readily transfer an article from the foot framework and the table to the conveyor.

17. A packaging and handling machine comprising, in combination, a frame assembly, a revolvable table mounted on the frame assembly about a vertical axis and having a plurality of material receiving stations thereon where material may be placed and manipulated, a first power operated locking means on the frame for locking said table in selected positions, an electrical power source having connected thereto a switch for said first power operated locking means and comprising a first circuit whereby a circuit is completed to said first power operated locking means to unlock said table for turning a table operated limit switch closed by said table when in one of said selected positions whereupon the material is positioned for removal from said table, a second power operated means fixedly mounted on the frame and associated with the table for moving material from a receiving station, a conveyor means for receiving the material from one of said stations on the revolvable table, a conveyor limit switch opened by the presence of material on said conveyor and when in a position to obstruct receiving of further material from said revolvable table, said table limit switch and said conveyor limit switch being connected with said power source and said second power operated means and comprising a second circuit and when closed energizing said second power operated means to move said material from the revolvable table to the conveyor.

18. A glass packaging and handling machine comprising, in combination, a frame assembly, a revolvable table mounted on the frame assembly about a vertical axis and having a plurality of glass receiving stations thereon, a locking means on said frame and cooperating with the revolvable table to permit selective rotation thereof and a power operated means on the frame and associated with said table for moving packaged glass from a glass receiving station.

19. A glass packaging and handling machine comprising a frame assembly, a revolvable table mounted on the frame assembly about a vertical axis and having a pin receiving recess and a plurality of glass receiving stations thereon permitting a packaging carton to be placed over the glass received on each of said stations, said glass receiving stations comprising pairs of spaced apart brackets extending parallel to a plane between each pair with the plane extending vertically and radially from the vertical axis of the revolvable table, said brackets having stops thereon for positioning the articles to receive the packaging carton to be placed thereover, a locking means on said frame including a reciprocable pin engaging said pin receiving recess on said table and cooperating with the revolvable table to permit selective rotation thereof; a power operated means fixed on said frame and permitting the receiving stations to move into alignment therewith for moving packaged glass from such stations after the table has been brought to a stopped position, said power operated means including a reciprocating piston acting radially for moving the packaged glass from a receiving station aligned therewith; a tilt table for receiving the packaged glass from said stations when moved therefrom by said power operated means, said tilt table being tiltable and having a power operator for tilting the same; and a conveyor for receiving the packaged glass from said tilt table through direct cooperative action of the tilt table with the conveyor.

20. A glass packaging and handling machine comprising in combination, a frame assembly, a revolvable table mounted on the frame assembly about a vertical axis and having a pin receiving recess and a plurality of glass receiving stations thereon where a packaging carton may be placed about the glass, a first power operated locking means on said frame including a reciprocable pin engaging said pin receiving recess on said table and cooperating with the revolvable table to permit selective rotation thereof, an electrical power source having connected thereto a switch for said first power operator and a first circuit therefor and including a solenoid operated relay circuit closer to complete said first circuit when said solenoid is energized; a second power operated means fixed on said frame and permitting the receiving stations to move into alignment therewith for moving packaged glass from such stations after the table has been brought to a stopped position, said second power operated means including a reciprocating piston acting radially for moving the packaged glass from a receiving station aligned therewith; a second circuit connected with said power source and to said second power operator for operating the same, said second circuit including a switch and said solenoid for the relay whose contacts are in said first circuit whereby when said second circuit is energized to actuate the second power operator to move packaged glass from a receiving station said first circuit is interrupted to prevent said first power operated locking means from withdrawing said pin from said pin receiving recess to unlock the revolvable table.

21. A glass packaging and handling machine according to claim 20 including a conveyor for receiving the packaged glass moved from one of said glass receiving stations on the revolvable table when moved therefrom by said second power operated means moving said piston.

22. A glass packaging and handling machine according to claim 20 wherein said glass receiving stations on said revolvable table each comprise pairs of spaced apart brackets extending parallel to a plane between each pair with the plane extending vertically and radially from the vertical axis of the revolvable table.

23. A glass packaging and handling machine according to claim 22 wherein said brackets have mounted on their outer portions spaced apart rollers having axes thereof extending parallel to each other and transverse to said vertical plane between each pair of said brackets.

References Cited in the file of this patent

UNITED STATES PATENTS

| | | |
|---|---|---|
| 1,086,192 | Lynd | Feb. 3, 1914 |
| 1,282,218 | Gordon | Oct. 22, 1918 |
| 1,622,836 | Madsen | Mar. 29, 1927 |
| 1,781,714 | Anderson | Nov. 18, 1930 |
| 1,832,410 | Myers | Nov. 17, 1931 |
| 2,146,616 | Bishop | Feb. 7, 1939 |
| 2,500,492 | Henriques | Mar. 14, 1950 |
| 2,573,848 | Kirchner | Nov. 6, 1951 |
| 2,597,246 | Kelly | May 20, 1952 |
| 2,603,339 | Malhiot | July 15, 1952 |
| 2,700,449 | Gleason et al. | Jan. 25, 1955 |
| 2,760,620 | Hull et al. | Aug. 28, 1956 |